United States Patent
Akiyama et al.

(10) Patent No.: US 9,400,231 B2
(45) Date of Patent: Jul. 26, 2016

(54) ENGINE BENCH SYSTEM

(71) Applicant: MEIDENSHA CORPORATION, Tokyo (JP)

(72) Inventors: Takao Akiyama, Tokyo (JP); Yoshimasa Sawada, Tokyo (JP); Nobuhiko Asakura, Tokyo (JP)

(73) Assignee: Meidensha Corporation, Tokyo (JP)

( * ) Notice: Subject to any disclaimer, the term of this patent is extended or adjusted under 35 U.S.C. 154(b) by 0 days.

(21) Appl. No.: 14/891,287

(22) PCT Filed: Apr. 21, 2014

(86) PCT No.: PCT/JP2014/061139
§ 371 (c)(1),
(2) Date: Nov. 13, 2015

(87) PCT Pub. No.: WO2014/185222
PCT Pub. Date: Nov. 20, 2014

(65) Prior Publication Data
US 2016/0084735 A1    Mar. 24, 2016

(30) Foreign Application Priority Data
May 15, 2013 (JP) ................................ 2013-103382

(51) Int. Cl.
*G01M 15/02* (2006.01)
*G01M 15/04* (2006.01)
*G01L 3/24* (2006.01)

(52) U.S. Cl.
CPC ............... *G01M 15/02* (2013.01); *G01L 3/242* (2013.01); *G01M 15/04* (2013.01); *G01M 15/044* (2013.01)

(58) Field of Classification Search
CPC ..... G01M 15/02; G01M 15/044; G01L 3/242
USPC ........................................................ 73/116.05
See application file for complete search history.

(56) References Cited

U.S. PATENT DOCUMENTS

| 4,995,139 A | 2/1991 | Suzuki |
| 6,434,454 B1 * | 8/2002 | Suzuki .................. G01M 15/02 701/32.9 |

(Continued)

FOREIGN PATENT DOCUMENTS

| JP | 2623758 | 6/1997 |
| JP | 2004-233223 | 8/2004 |

(Continued)

OTHER PUBLICATIONS

JP Office Action dated Jun. 26, 2014 from corresponding JP Appl. No. 103382, 2 pp.

*Primary Examiner* — Freddie Kirkland, III
(74) *Attorney, Agent, or Firm* — Muncy, Geissler, Olds & Lowe, P.C.

(57) ABSTRACT

Provided is an engine bench system capable of performing a racing test with good precision. A test body is separated into an engine main body and intermediate coupling body for connecting a crankshaft and an output shaft of the dynamometer. The engine bench system is provided with: a shaft torque sensor for detecting torsional torque; a shaft torque command generation apparatus for calculating a dynamo-side shaft torque command value by summing an engine-side shaft torque command value, and a torque value proportional to the moment of inertia of the intermediate coupling body; and a shaft torque controller for generating a torque control signal on the basis of the dynamo-side shaft torque command value and the output value of the shaft torque sensor.

2 Claims, 4 Drawing Sheets

(56) References Cited

U.S. PATENT DOCUMENTS

| | | | | |
|---|---|---|---|---|
| 6,768,940 B2 * | 7/2004 | Akiyama | ............ | G01M 15/044 701/114 |
| 6,775,610 B2 * | 8/2004 | Akiyama | ............ | G01M 15/044 701/110 |
| 7,610,799 B2 * | 11/2009 | Sugita | ................ | F02D 41/1497 73/114.15 |
| 7,770,440 B2 * | 8/2010 | Langthaler | .......... | G01M 13/025 73/114.15 |
| 8,006,548 B2 * | 8/2011 | Akiyama | .............. | G01M 15/02 73/116.05 |
| 8,770,019 B2 * | 7/2014 | Grunbacher et al. | . | G01M 15/05 73/116.05 |
| 9,255,856 B2 * | 2/2016 | Takahashi | ................ | G01L 5/24 |
| 2010/0251811 A1 | 10/2010 | Akiyama et al. | | |
| 2015/0101421 A1 * | 4/2015 | Takahashi | ................ | H02P 6/06 73/862.325 |

FOREIGN PATENT DOCUMENTS

| | | |
|---|---|---|
| JP | 2009-133714 | 6/2009 |
| JP | 2010-223861 | 10/2010 |
| JP | 2012-068200 | 4/2012 |
| JP | 3405924 | 5/2013 |

* cited by examiner

ENGINE BENCH SYSTEM

TECHNICAL FIELD

The present invention relates to an engine bench system. In more detail, it relates to an engine bench system that connects a dynamometer as a power absorber to a test body equipped with an engine.

BACKGROUND ART

FIG. 5 is a view showing the configuration of an engine bench system 100.

The engine bench system 100 includes: a test body W constituted by an engine E and output shaft SW thereof; a dynamometer DY connected as a power absorber to the output shaft SW of this test body W; an engine controller 120 that controls the engine E via a throttle actuator 110; a dynamo controller 140 that controls the dynamometer DY via an inverter 130; an encoder 150 that detects the revolution speed of the output shaft of the dynamometer DY; and a shaft torque sensor 160 that detects shaft torque (torsional torque) of a coupling unit between the output shaft SW of the test body W and the output shaft of the dynamometer DY. It should be noted that FIG. 5 is illustrated by simplifying the mechanical elements such as the clutch, transmission and propeller shaft as the output shaft SW, collectively.

The engine controller 120 controls the output of the engine E to a state established in advance for every test item, and the dynamo controller 140 controls the revolution speed and torque of the dynamometer DY based on the outputs, etc. of the encoder 150 and shaft torque sensor 160 (e.g., refer to Patent Document 1).

Patent Document 1: Japanese Unexamined Patent Application, Publication No. 2009-133714

DISCLOSURE OF THE INVENTION

Problems to be Solved by the Invention

However, as one of the test items by the above such engine bench system 100, there is a test called a racing test. Racing test measures the characteristics of an engine during so-called revving. More specifically, it measures the change in revolution speed of the dynamometer DY when fully opening the throttle aperture for a short time from the idling state (e.g., building up of revolution speed, highest value, etc.).

With the engine bench system 100 of the above configuration such as that shown in FIG. 5, in the case of performing such a racing test, it sets a shaft torque command value inputted to the dynamometer controller 140 at 0. In other words, the dynamo controller 140 causes a torque to be generated by the dynamometer DY so that the torsional torque is not produced at the shaft torque sensor 160, i.e. load does not act on the engine E.

FIG. 6 is a graph showing the results of a racing test of the conventional engine bench system 100. FIG. 6 shows the measurement results by the engine bench system 100, i.e. revolution speed measured by the encoder 150, by the thin solid line. In addition, FIG. 6 shows the results in the case of measuring with the engine standing alone by the bold dotted line. Herein, engine standing alone refers to a state in which the engine E and the output shaft SW are detached, and the engine E is unloaded. In other words, the bold dotted line in FIG. 6 shows the variation in the actual engine revolution speed in the case of setting the throttle to fully open while the clutch is disengaged. Therefore, the bold dotted line in FIG. 6 is the value serving as the ideal value for the measurement result by the engine bench system 100.

As shown in FIG. 6, the measurement result (thin solid line) by the engine bench system 100 is always less than the ideal value (bold dotted line). As described above, the engine bench system 100, upon performing the racing test, tries to reproduce a state such that a load does not act on the engine E by setting the shaft torque command value to 0. However, the inertia of a portion from the shaft torque sensor 160 to the crankshaft of the engine E, i.e. output shaft SW, must cause loading on the side of the engine E, and as a result thereof, the measurement results fall below the ideal value during both acceleration and deceleration. In the above way, it is difficult for the conventional engine bench system 100 to accurately measure the performance of the engine standing alone in the racing test.

It should be noted that, in theory, the inertia of the output shaft SW can also be made to be loaded on the dynamometer DY if the position of the shaft torque sensor 16 is made closer to the crankshaft side of the engine E. However, since the heat of the engine E is more easily transferred as the shaft torque sensor 160 approaches the engine E, the influence of the variation in measurement values due to the temperature drift increases. In addition, the vibrations of the engine E tend to be transferred more as the shaft torque sensor 160 is made closer to the engine E, whereby the measurement accuracy declines. For the above such reasons, it is preferable for the position of the shaft torque sensor 160 to be closer to the dynamometer DY than the engine E.

The present invention has an object of providing an engine bench system that can perform a racing test accurately, based on the output value of a shaft torque meter provided closer to the dynamometer than the engine.

Means for Solving the Problems

In order to achieve the above-mentioned object, a first aspect of the present invention provides an engine bench system (e.g., the engine bench system 1 described later) that includes: a dynamometer (e.g., the dynamometer DY described later) having an output shaft connected to a test body (e.g., the test body W described later); and a shaft torque detector (e.g., the shaft torque sensor 7 described later) that detects torsional torque (T23) at a coupling unit between the output shaft of the dynamometer and the test body, in which the test body is divided into an engine main body (e.g., the engine main body W1 described later) and an intermediate coupling body (e.g., the intermediate coupling body W2 described later) that connects a crankshaft of the engine main body with the output shaft of the dynamometer. The engine bench system includes: a shaft torque command generation apparatus (e.g., the shaft torque command generation apparatus 61 described later) that calculates a dynamo-side torque command value (T23ref) corresponding to a command value for torsional torque at the shaft torque detector, by totaling an engine-side shaft torque command value (T12ref) corresponding to a command value for torsional torque (T12) at a coupling unit between the intermediate coupling body and the engine main body, and a torque value proportional to an inertia moment (J2) of the intermediate coupling body; and a shaft torque controller (e.g., the shaft torque controller 62 described later) that generates a torque control signal (T3) for the dynamometer, based on the dynamo-side shaft torque command value (T23ref) and an output value (T23) of the shaft torque detector.

According to a second aspect of the present invention, in this case, it is preferable for the engine bench system to further include a revolution speed detector (e.g., the encoder 8 described later) that detects a revolution speed of the output shaft of the dynamometer, in which the shaft torque command generation apparatus calculates a dynamo-side shaft torque command value (T23ref) by totaling the engine-side shaft torque command value and a torque value obtained by multiplying an inertia moment of the intermediate coupling body by a differential value of the output of the revolution speed detector.

Effects of the Invention

The present invention according to the first aspect detects torsional torque at the coupling unit between the dynamometer and the test body consisting of the engine main body and intermediate coupling body by way of the shaft torque detector, and generates the torque control signal based on the output value of the shaft torque detector and a predetermined dynamo-side shaft torque command value by way of the shaft torque controller. In addition, the shaft torque command generation apparatus of the present invention calculates the dynamo-side shaft torque command value by totaling the predetermined engine-side shaft torque command value and the torque value proportional to the inertia moment of the intermediate coupling body, and then inputs to the above-mentioned shaft torque controller. The present invention can cause at least a portion of the inertia of the intermediate coupling body to be loaded on the dynamometer side by determining the dynamo-side shaft torque command value to include a torque value proportional to the inertia moment of the intermediate coupling body in this way. Therefore, according to the present invention, since it is possible to reduce the load acting on the engine main body compared to conventionally, the performance of only the engine main body can be accurately evaluated in a racing test.

The present invention according to the second aspect calculates the dynamo-side shaft torque command value by totaling a predetermined engine-side shaft torque command value and a torque value obtained by multiplying the inertia moment of the intermediate coupling body by the differential value of the output of the revolution speed detector (i.e. torque value for accelerating/decelerating the intermediate coupling body). In the engine bench system of the present invention, the approximation by the three-inertia system model constituted by connecting the three inertia fields with two spring elements is appropriate. When this is done, since the torque value for accelerating/decelerating the intermediate coupling body becomes substantially equal to the difference between the dynamo-side shaft torque and engine-side shaft torque, by determining the dynamo-side shaft torque command value in this way, it is possible to control the engine-side shaft torque with a shaft torque detector provided more to the side of the dynamometer than the intermediate coupling body. Therefore, according to the present invention, since a state is realized in which the engine main body is substantially unloaded by simply setting the engine-side shaft torque command value to 0, it is possible to accurately evaluate the performance of only the engine main body in a racing test.

PREFERRED MODE FOR CARRYING OUT THE INVENTION

Hereinafter, an embodiment of the present invention will be explained in detail while referencing the drawings.

Figure 1:
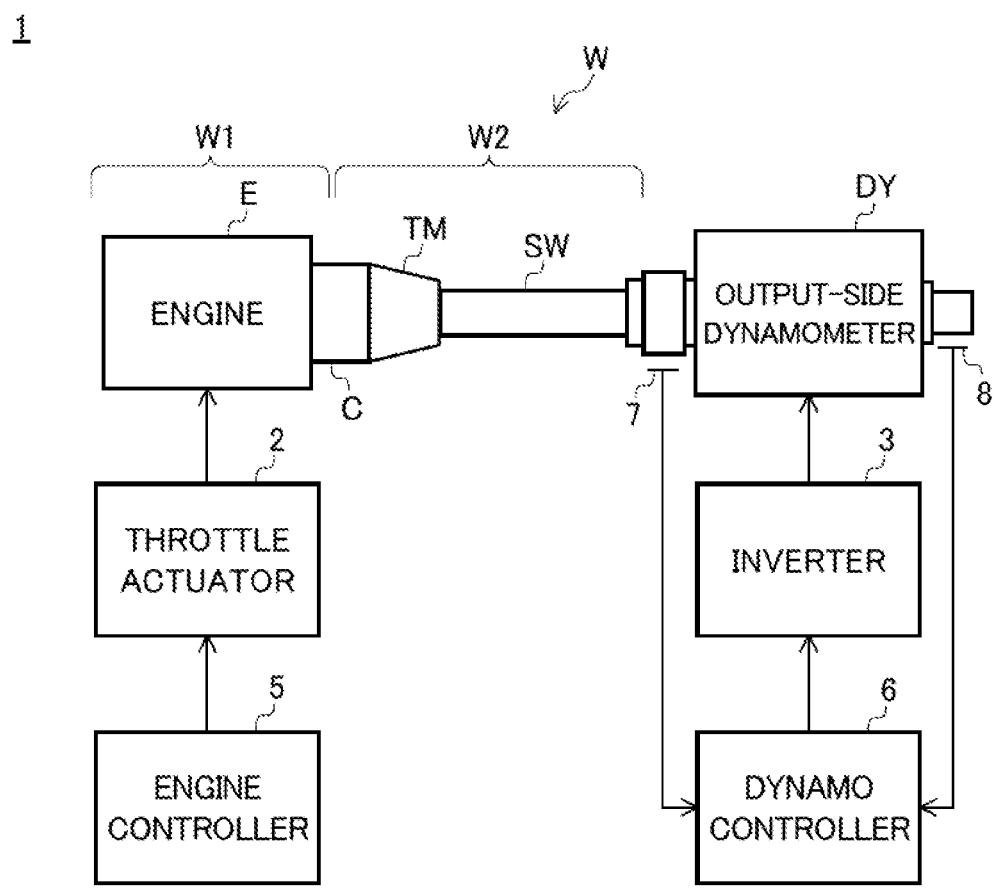
FIG. 1 is a view showing the configuration of an engine bench system according to an embodiment of the present invention.

FIG. 1 is a view showing the configuration of an engine bench system 1 according to the present embodiment.

The engine bench system 1 includes: a test body W that includes an engine E and shaft SW; a dynamometer DY that is connected as a power absorber to the test body W; an engine controller 5 that controls the engine E via a throttle actuator 2; a dynamo controller 6 that controls the dynamometer DY via an inverter 3; a shaft torque sensor 7 that detects torsional torque at a coupling unit between the shaft SW of the test body W and the output shaft SD of the dynamometer DY; and an encoder 8 that detects the revolution speed of the output shaft SD of the dynamometer DY.

The test body W serving as the test target by the engine bench system 1 is configured by combining the engine E, a clutch C, a transmission TM, and a shaft SW, as shown in FIG. 1. In other words, this test body W is made to be able to disengage the mechanical coupling between the engine main body W1 including the engine E and crankshaft thereof, and an intermediate coupling body W2 including the transmission TM and shaft S, at the clutch C. In addition, the test body W includes the clutch C and transmission TM in this way; therefore, the overall rigidity is lower than the rigidity of the shaft torque sensor 7.

The engine controller 5 controls the output of the engine E according to the situation established for every test item.

The dynamo controller 6 generates, and inputs to the encoder 8, a torque control signal corresponding to the torque value to be generated by the dynamometer DY based on the outputs of the shaft torque sensor 7 and encoder 8 so that the power of the engine E is absorbed in the situation established for every test item.

Next, the configuration of the dynamo controller 6 will be explained. In the present embodiment, the configuration of the mechanical system of the engine bench system 1 is approximated by a three-inertia system model constituted by connecting three inertia fields respectively having unique inertia moments such as those shown in FIG. 2, with two spring elements. As mentioned above, the test body is low rigidity as a whole; therefore, the approximation by a three-inertia system model as shown in FIG. 2 is appropriate.

Figure 2:
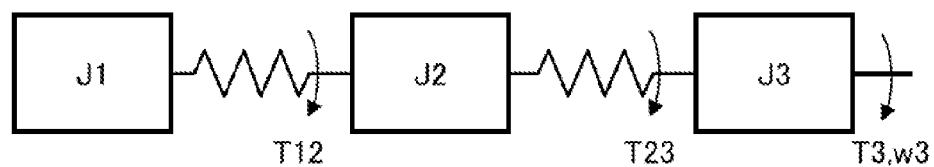
FIG. 2 is a view showing a three-inertia system model corresponding to the mechanical system of the engine bench system according to the above-mentioned embodiment.

In FIG. 2, "J1" corresponds to the inertia moment of the engine main body. "J3" corresponds to the inertia moment of the dynamometer. "J2" corresponds to the inertia moment of the intermediate coupling body. It should be noted that the specific values of these three inertia moments J1 to J3 are determined by performing experiments in advance.

"T12" corresponds to the torsional torque at the coupling unit between the engine main body and the intermediate coupling body. "T23" corresponds to the torsional torque at the coupling unit between the intermediate coupling body and the dynamometer. Hereinafter, torsional torque T12 refers to the engine-side shaft torque, and torsional torque T23 refers to dynamo-side shaft torque. In addition, the dynamo-side shaft torque T23 corresponds to the output value of the shaft torque sensor. "T3" corresponds to the generated torque of the dynamometer. In other words, the generated torque T3 corresponds to the value of the torque control signal generated by the dynamometer controller 6. "w3" corresponds to the revolution speed of the output shaft of the dynamometer. In other words, the revolution speed w3 corresponds to the output value of the encoder.

Figure 3:
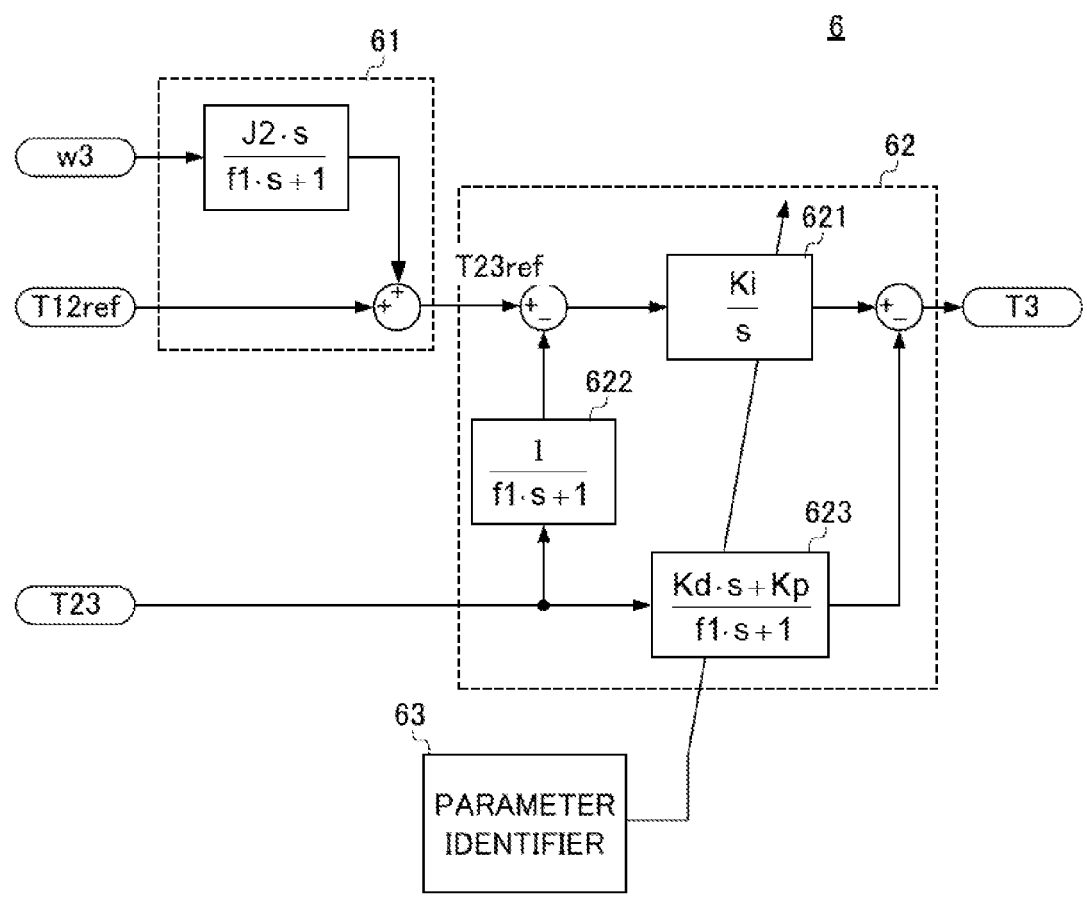
FIG. 3 is a block diagram showing the configuration of a control circuit for shaft torque control according to the above-mentioned embodiment.

FIG. 3 is a block diagram showing the configuration of a control circuit for shaft torque control by the dynamo controller 6.

The dynamo controller 6 includes: a shaft torque command generation apparatus 61 that generates a command value T23ref for the dynamo-side shaft torque; a shaft torque controller 62 that generates a torque control signal T3 based on the dynamo-side shaft torque command value T23ref and the output value T23 of the shaft torque sensor; and a parameter identifier 63 that sequentially identifies control parameters to be used in the shaft torque controller 62.

The shaft torque command generation apparatus 61 generates a command value for the dynamo-side shaft torque T23, based on the command value T12ref for the engine-side shaft torque T12 and the output value w3 of the encoder. More specifically, the shaft torque command generation apparatus 61 sets a value arrived at by totaling the engine-side shaft torque command value T12ref inputted from outside, and a torque value for accelerating/decelerating the intermediate coupling body, i.e. torque value obtained by multiplying the inertia moment J2 of the intermediate coupling body by a value arrived at by conducting quasi-differentiation on the output value w3 of the encoder, as the dynamo-side shaft torque command value T23ref. It should be noted that a predetermined value is used for the cut-off frequency f1 characterizing the quasi-differential.

$$T23ref = T12ref + \frac{J2 \cdot w3 \cdot s}{f1 \cdot s + 1} \quad (1)$$

The shaft torque controller 62 generates the torque control signal T3 based on the dynamo-side shaft torque command value T23ref and the shaft torque sensor output T23. More specifically, the shaft torque controller 62 generates the torque control signal T3 by the computation shown in formula (2) below with the shaft torque command value T23ref and shaft torque sensor output T23 as inputs.

$$T3 = \frac{Ki}{s}\left(T23ref - \frac{1}{f1 \cdot s + 1}T23\right) - \frac{Kd \cdot s + Kp}{f1 \cdot s + 1}T23 \quad (2)$$

The computation of formula (2) above consists of an integration operation on the deviation between the dynamo-side shaft torque command value T23ref and the filter value of the shaft torque sensor output T23, a differential operation on the shaft torque sensor output T23, and a proportional operation on the shaft torque sensor output T23.

In the shaft torque controller 62, the deviation between the dynamo-side shaft torque command value T23ref and the shaft torque sensor output T23 is controlled so as to decrease, by way of the integration operation in block 621. In addition, when assuming the revolution speed w2 of the intermediating coupling body and the revolution speed w3 of the dynamometer to be equal in the equation of motion of the three-inertia system model shown in FIG. 2, formula (3) below is derived.

$$J2(dw3/dt) = T23 - T12 \quad (3)$$

Therefore, in the above-mentioned shaft torque command generation apparatus 61, formula (4) below is derived by including the torque value (J2(dw3/dt)) for accelerating/decelerating the intermediate coupling body in the dynamo-side shaft torque command value as shown in formula (1) above. In other words, by controlling the dynamometer so that the deviation between the dynamo-side shaft torque command value T23ref and the shaft torque sensor output T23 decreases by way of the integration operation in the shaft torque controller 62, it is possible for the deviation between the engine-side shaft torque command value T12ref inputted from outside and the engine-side shaft torque T12 to be made smaller at the same time.

$$T12ref - T12 = T23ref - T23 \quad (4)$$

It should be noted that, for the shaft torque sensor output T23, the influence of vibration in a high-frequency band is suppressed by passing through a filter operation in block 622. In addition, in the shaft torque controller 62, the vibration of low-rigidity springs of the test body is suppressed by the differential operation and proportional operation in block 623.

The parameter identifier 63 sequentially identifies specific values of control parameters Ki, Kd and Kp of the shaft torque controller 62, based on values such as inertia moments J1 to J3, the spring stiffness K12 between the engine main body and intermediate coupling body, and spring stiffness K23 between the intermediate coupling body and dynamometer. It should be noted that the detailed sequence of identifying the specific values of these control parameters Ki, Kd and Kp are published in Japanese Unexamined Patent Application, Publication No. 2009-133714 by the applicants of the present application; therefore, an explanation in further detail thereto will be omitted herein.

The results of the racing test of the engine bench system 1 configured in the above way will be explained next.

Figure 4:
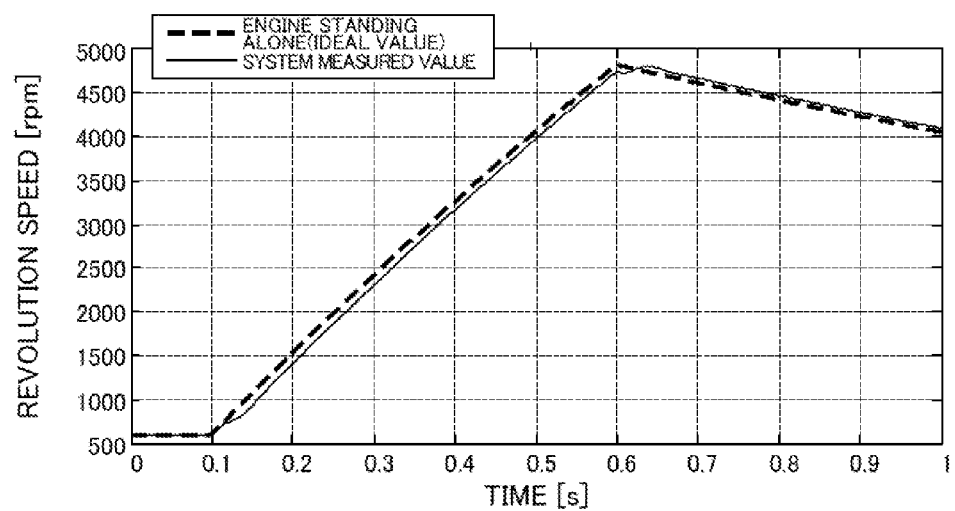
FIG. 4 is a graph showing the results of a racing test by the engine bench system according to the above-mentioned embodiment.
Figure 5:
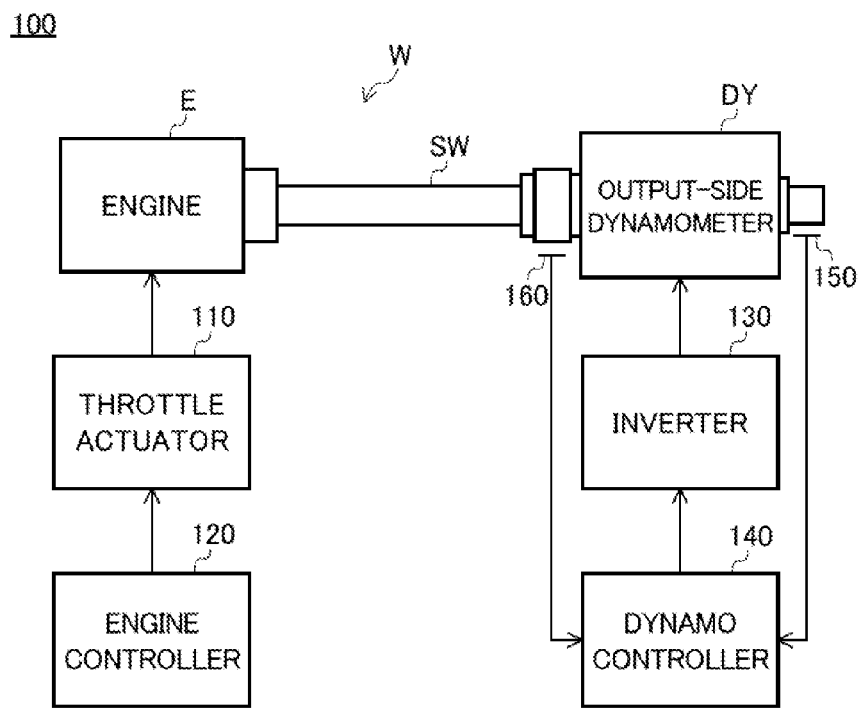
FIG. 5 is a view showing the configuration of a conventional engine bench system.
Figure 6:
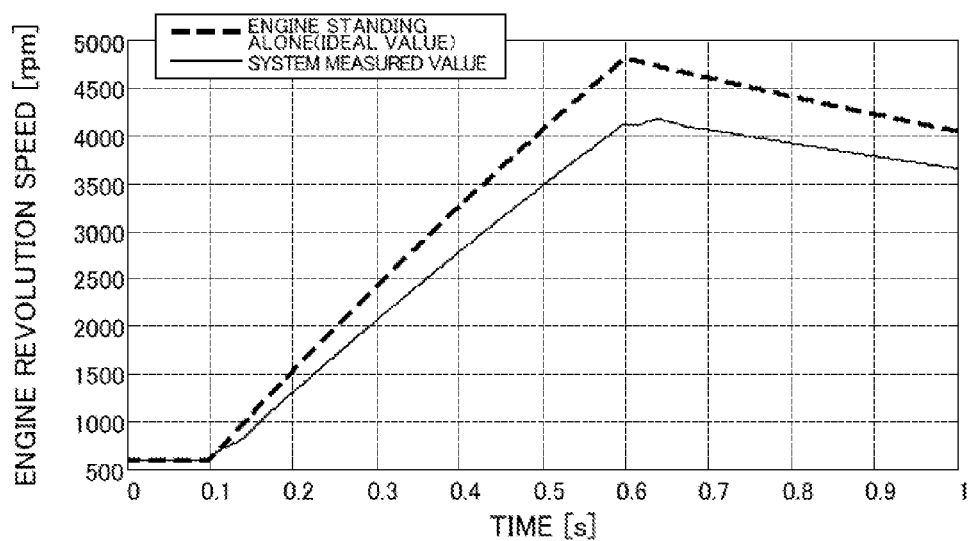
FIG. 6 is a graph showing the results of a racing test by the conventional engine bench system.

FIG. 4 is a graph showing the results of a racing test by the engine bench system 1 of the present embodiment. FIG. 4 shows the measurement results by the engine bench system 1, i.e. revolution speed measured by the encoder 8, with a thin solid line. In order to decrease the load acting on the engine in this racing test, the engine-side shaft torque command value T12ref was set to 0. In addition, similarly to FIG. 6, FIG. 4 shows the values serving as the ideal values of the measurement results by the engine bench system 1 with a bold dotted line.

As shown in FIG. 4, although a slight delay is recognized immediately after opening the accelerator at time t=0.1, it substantially matches with the ideal value during both acceleration at time t=0.1 to 0.6 and deceleration from time t=0.6 and onwards. In other words, it was verified that the engine bench system of the present embodiment can accurately measure the performance of only the engine main body even while the clutch is engaged, by causing the intermediate coupling body to accelerate/decelerate with the dynamometer so that the engine-side shaft torque becomes 0 according to the control circuit shown in FIG. 3.

EXPLANATION OF REFERENCE NUMERALS 1 engine bench system
61 shaft torque command generation apparatus
62 shaft torque controller

7 shaft torque sensor (shaft torque detector)
8 encoder (revolution speed detector)
DY dynamometer
W test body
W1 engine main body
W2 intermediate coupling body

The invention claimed is:

1. An engine bench system comprising:
   a dynamometer having an output shaft connected to a test body;
   a shaft torque detector that detects torsional torque at a coupling unit between the output shaft of the dynamometer and the test body,
   the test body being divided into an engine main body and an intermediate coupling body that connects a crankshaft of the engine main body with the output shaft of the dynamometer;
   a shaft torque command generation apparatus that calculates a dynamo-side torque command value corresponding to a command value for torsional torque at the shaft torque detector, by totaling an engine-side shaft torque command value corresponding to a command value for torsional torque at a coupling unit between the intermediate coupling body and the engine main body, and a torque value proportional to an inertia moment of the intermediate coupling body; and
   a shaft torque controller that generates a torque control signal for the dynamometer, based on the dynamo-side shaft torque command value and an output value of the shaft torque detector.

2. The engine bench system according to claim 1, further comprising a revolution speed detector that detects a revolution speed of the output shaft of the dynamometer,
   wherein the shaft torque command generation apparatus calculates a dynamo-side shaft torque command value by totaling the engine-side shaft torque command value and a torque value obtained by multiplying an inertia moment of the intermediate coupling body by a differential value of the output of the revolution speed detector.

* * * * *